United States Patent
Ubillos

(10) Patent No.: US 7,697,017 B2
(45) Date of Patent: Apr. 13, 2010

(54) 16:9 ASPECT RATIO AND ANAMORPHIC IMAGE PROCESSING

(75) Inventor: Randall Hayes Ubillos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 246 days.

(21) Appl. No.: 11/484,242

(22) Filed: Jul. 10, 2006

(65) Prior Publication Data

US 2006/0250422 A1 Nov. 9, 2006

Related U.S. Application Data

(63) Continuation of application No. 10/934,870, filed on Sep. 3, 2004, now Pat. No. 7,075,559, which is a continuation of application No. 09/583,821, filed on May 30, 2000, now Pat. No. 6,791,578.

(51) Int. Cl.
*G09G 5/00* (2006.01)

(52) U.S. Cl. .................. 345/660; 345/670; 345/671

(58) Field of Classification Search ................ 345/660, 345/670, 671
See application file for complete search history.

(56) References Cited

U.S. PATENT DOCUMENTS

| | | | |
|---|---|---|---|
| 5,255,098 A | 10/1993 | Poivet et al. | |
| 5,448,315 A | 9/1995 | Soohoo | |
| 5,650,831 A | 7/1997 | Farwell | |
| 5,682,326 A | 10/1997 | Klingler et al. | |
| 5,841,512 A | 11/1998 | Goodhill | |
| 5,930,050 A | 7/1999 | Dewald | |
| 5,999,220 A | 12/1999 | Washino | |
| 6,011,553 A | 1/2000 | Komiyama | |
| 6,157,410 A * | 12/2000 | Izumi et al. | 348/445 |
| 6,393,202 B1 | 5/2002 | Yamauchi et al. | |
| 6,573,819 B1 | 6/2003 | Oshima et al. | |
| 6,788,347 B1 * | 9/2004 | Kim et al. | 348/441 |
| 6,788,880 B1 * | 9/2004 | Fuchigami et al. | 386/96 |
| 2001/0017667 A1 | 8/2001 | Frink et al. | |
| 2003/0020671 A1 | 1/2003 | Santoro et al. | |

FOREIGN PATENT DOCUMENTS

| | | |
|---|---|---|
| EP | 0716545 A2 | 6/1996 |
| EP | 0808061 A2 | 11/1997 |
| JP | 5-508522 | 11/1993 |

(Continued)

OTHER PUBLICATIONS

Apple Computer, Inc. "Final Cut Pro User's Manual", 1999, url http://download.info.apple.com/Apple_Support_Area/Manuals/software/FCP12UM.pdf.

(Continued)

*Primary Examiner*—Bhavesh M Mehta
*Assistant Examiner*—Mike Rahmjoo
(74) *Attorney, Agent, or Firm*—Blakely, Sokoloff, Taylor & Zafman LLP

(57) ABSTRACT

A method and apparatus is described for receiving a first data stream comprising a graphic image having an aspect ratio of 16:9 into a computer system, capturing the image within a storage device of the computer system, and displaying the image on a graphical user interface of the computer system in a 16:9 aspect ratio format.

40 Claims, 9 Drawing Sheets

| | FOREIGN PATENT DOCUMENTS | |
|---|---|---|
| JP | 07-322168 | 12/1995 |
| JP | 9-70014 | 3/1997 |
| JP | 09-214856 | 8/1997 |
| JP | 09-326974 | 12/1997 |
| JP | 10-233978 | 9/1998 |
| JP | 11-098423 | 9/1999 |
| JP | 2000-069362 | 3/2000 |
| JP | 2000-100133 | 4/2000 |
| JP | 2000-122772 | 4/2000 |
| WO | WO91/19384 | 12/1991 |
| WO | WO98/46016 | 10/1998 |

OTHER PUBLICATIONS

PCT International Search Report for PCT Appln No. US01/16827, mailed Oct. 10, 2001 (7 pages).

PCT Written Opinion for PCT Appln No. US01/16827, mailed Jun. 24, 2002 (4 pages).

PCT International Preliminary Examination Report for PCT Appln No. US01/16827, mailed Jun. 26, 2003 (5 pages).

IBM Technical Disclosure Bulletin, "Wrapped Window Display Method for Viewing Wide Angle Multimedia Material," vol. 37, Issue 2B, pp. 53-54 (Feb. 1, 1994).

* cited by examiner

16:9 ASPECT RATIO AND ANAMORPHIC IMAGE PROCESSING

This application is a continuation of U.S. patent application Ser. No. 10/934,870, filed on Sep. 3, 2004, now U.S. Pat. No. 7,075,559 which is a continuation of U.S. patent application Ser. No. 09/583,821, filed on May 30, 2000, now issued as U.S. Pat. No. 6,791,578.

FIELD OF THE INVENTION

The present invention relates to video capturing and editing. In particular, the present invention relates to capturing and sequencing of video data streams in a 16:9 visual display format.

BACKGROUND

Standard NTSC (National Television System Committee) and PAL (Phase Alternation Line) televisions have a picture aspect ratio of 4:3. This means that the ratio of the width of the visible area to the height of the visible area is 4/3, or 1.33. HDTV (High Definition Television) specifies several formats that have a picture aspect ratio of 16:9, or 1.78.

If a program recorded with an aspect ratio of 16:9 is displayed on a device with an aspect ratio of 4:3 such that the entire width is visible, black bars are seen at the top and bottom of the picture. This is known as letterboxing.

If the original program material had 480 active lines (as in NTSC-Digital Video), then the area which contains the active image for a letterboxed program is only 360 lines, or 75% of the total viewable area. If this letterboxed program is recorded into a format that has an inherent resolution of 480 lines, then 25% of the recorded material is empty.

To improve this situation, a technique called anamorphic transfer was developed. In this process, the active area of the 16:9 program is stretched vertically to fill all 480 lines of the recorded material. To view this type of material, the display device needs to 'squish' the vertical dimension by 25%; exactly canceling out the stretch which was performed during recording. This has the benefit of putting 480 lines into a smaller vertical space, reducing the appearance of scan lines. If the source material is film, which has no inherent 'line count', the vertical stretch is accomplished optically, giving an increase in vertical resolution.

This process was originally developed and used on Laserdiscs and DVDs (Digital Video Discs), and many high end television sets have the capability of performing the 16:9 'squish' to properly view this type of material.

The popularity of the 'letterboxed look' prompted several consumer DV (Digital Video) camcorder manufacturers to add a '16:9' or 'HDTV' mode to their cameras. In order to do this correctly, the camera needs either an anamorphic element in the optical path in front of the CCD (Charged Couple Device) or photo sensitive sensor, or the elements in the CCD or sensor need to be shaped in an anamorphic fashion. This turns out to be very expensive to do, so most cameras 'cheat' to get this effect.

By taking the center 360 lines of the image and digitally stretching them to 480 lines, a result which is similar to having an anamorphic lens element is achieved. The drawback here is that all of the lines in the recorded material are actually manufactured lines, each one being a mix of two consecutive scan lines on the CCD. This does not give the increase in resolution that using an anamorphic lens adapter does.

In order to preserve the proper aspect ratio on the camera's viewfinder, the camera will perform a vertical 'squish' when displaying 16:9 material. This is detected in a DV camcorder by inspecting a bit in each frame in the DV stream. This 'squish' operation requires some amount of hardware to do on the NTSC or PAL output signal, so most consumer camcorders only modify the data displayed in their viewfinder. Some higher end decks, however, can also perform this 'squish' on the NTSC or PAL output, giving a letterboxed image on a television without the capability to do a 16:9 squish by themselves.

With a camera which has an anamorphic lens adapter attached, recording can be done as usual. The noticeable effect will be that in the viewfinder the image will appear stretched vertically, and the recorded image will only look correct on a monitor with a vertical 'squish' function.

For a DV camcorder set to 16:9 mode the material in the viewfinder will look correct, but the output of the camera will need to be displayed on a monitor with a 16:9 'squish'.

Editing can be performed on this material, as the anamorphic nature of the picture content does not affect access to the material. Some rendered effects will be fine, such as cross dissolves. However, any effects that generate shapes, or motion effects involving rotation will produce noticeable distortion in the image. Also, any composited graphics are likely to be distorted without careful aspect distortion. (All of these effects are distorted due to the change in the shape of each pixel that an anamorphic lens creates).

SUMMARY

What is disclosed is a method and apparatus for receiving a first data stream comprising a graphic image having an aspect ratio of 16:9 into a computer system, capturing the image within a storage device of the computer system, and displaying the image on a graphical user interface of the computer system in a 16:9 aspect ratio format. Also disclosed is a method and apparatus for editing a source data stream, such as a video segment, with one or more video clips conforming the finished edited sequence into a 16:9 aspect ratio display format.

Other features and advantages of the present invention will be apparent from the accompanying drawings and detailed description to be followed.

BRIEF DESCRIPTION OF THE DRAWINGS

The present invention is illustrated by way of examples and not as limitations in the figures of the accompanying drawings in which.

DETAILED DESCRIPTION

Figure 1A:
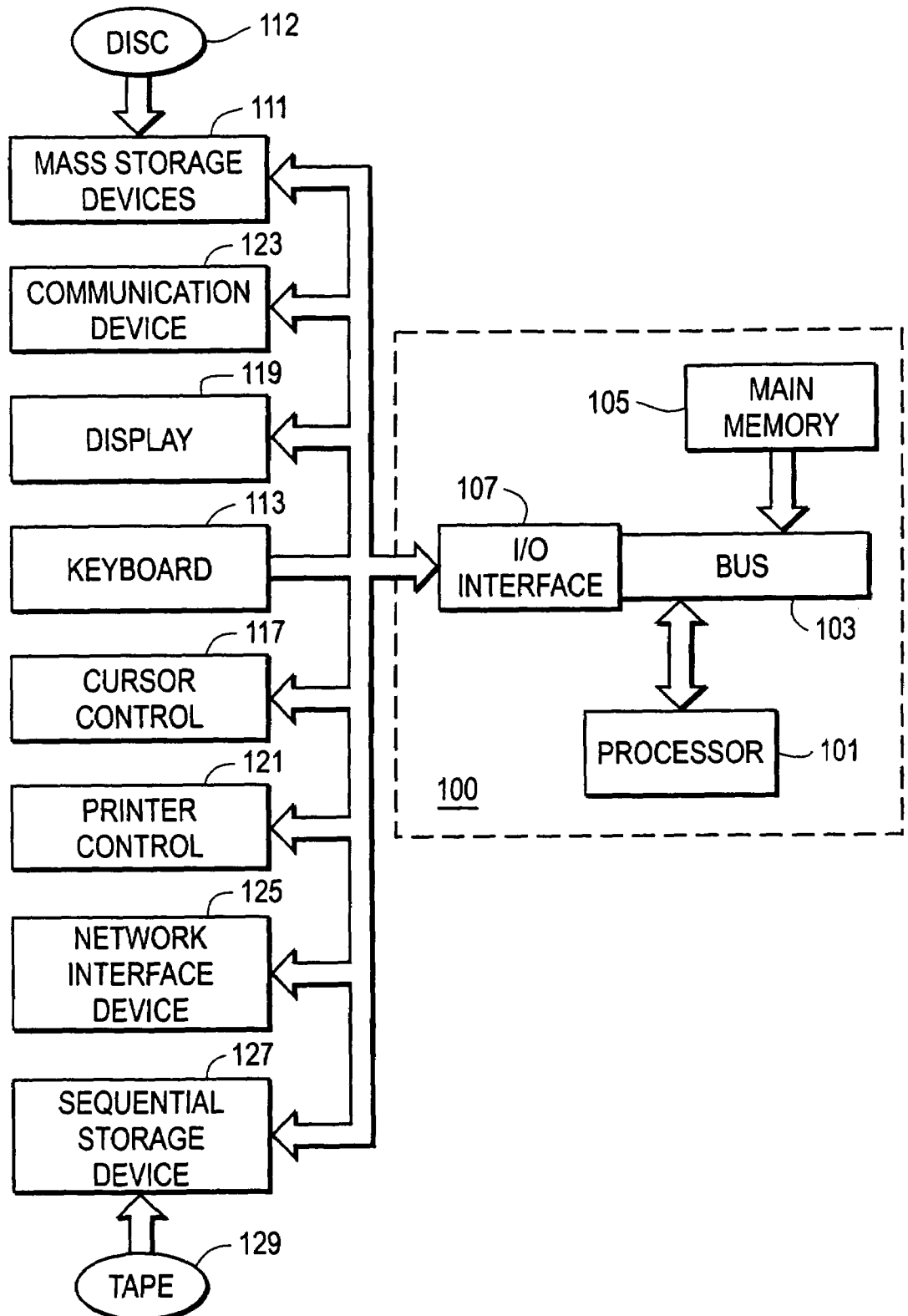
FIG. 1a is a diagram of a computer system that may contain an embodiment of the invention.

FIG. 1a is an example of a computer system 100 in which an embodiment of the invention may be incorporated. The computer system 100 comprises a processor 101 coupled to a main memory 105 via a bus 103. The main memory 105 may be dynamic random access memories (DRAMs) or other suitable memories.

Data and instructions are stored in the main memory 105 which are processed by the processor 101. Generally, coupled to the bus 103 is a read only memory (ROM) in which the basic input/output instructions (BIOS) are stored. Further coupled to the bus 103 are various controllers such as memory management unit (MMU), interrupt controller, video controller, direct memory access controller (DMA) and input/output (I/O) controller, among others, all which are not shown in the figure. Further coupled to the bus 103 is a 1/0 interface 107 to which the various 1/0 devices are coupled to. Examples of the 1/0 devices are mass storage devices 111 such as magnetic disc drives and/or optical disc drives, an alphanumeric input device 113 such as a keyboard, a cursor control device 117 such as a mouse or a trackball, a display device 119 such as a monitor or a liquid crystal display (LCD), a printer device 121 such as a printer, a communication device 123 such as a modem and a network interface device 125 such as Ethernet.

Additionally, a sequential storage device 127 such as a video tape deck or a video camcorder is coupled to the computer through the 1/0 controller 107. For example, the sequential storage device 127 can be connected through the printer port, modem port, or Apple FireWire port. Below is a list of deck protocols that may be used:

Apple® FireWire
Apple® FireWire Basic
JVC® RS-232
Panasonic® RS-232
Sony® RS-422
Sony® RS-232
Sony® VISCA
Sony® LANC Using the video tape deck as an example, the video tape deck 127 stores edited video clips and/or accompanying audio clips in a video tape 129 formatted in accordance with an embodiment of the invention. In its one format, the video tape 129 may be in "Black and Code." Black and Code defines a format in which the video tape is written with black pictures with no sound and throughout the tape, timecodes are inserted. Timecodes allow the video tape deck 127 to keep track of the various positions within a tape thereby allowing quick and fast navigation through the tape. Generally, the video tape deck 127 is controlled in a manner such that when a clip is being recorded, the tape head backs up to a certain distance and rolls forward to synchronize with the last frame using the timecode and starts recording. In this manner, an unsightly gap between the clip and the last frame recorded is not formed. Thus, between the two recorded clips, it is perceived as being one continuous clip.

The computer system 100 described above is readily available commercially. Preferably, the computer system 100 is one of the Macintosh® family of personal computers such as the Macintosh®, G3 PowerMac® brand personal computers manufactured by Apple Computer®, Inc. of Cupertino, Calif. The processor can be one of the Power PC family of microprocessors such as the G4 or G3 PowerPC® such as those manufactured by Motorola®, Inc. of Schaumburg, Ill. However, other systems and processors may be used. It will be appreciated that the computer system 100 represents only one example of a system, which may have many different configurations and architectures, and which may be employed with the present invention. For example, Macintosh and Intel systems often have multiple busses, such as a peripheral bus, a dedicated cache bus, etc. On the other hand, a network computer, which may be used as a computer system of the present invention, may not include, for example, a hard disk or other mass storage device, but may receive routines and/or data from a network connection, such as the modem or network interface, to be processed by a processor. Similarly, a Web TV system, which is known in the art, may be considered to be a computer system of the present invention, but such a system may not include one or more I/O devices, such as those described above with reference to I/O device(s). Additionally, a portable communication and data processing system, which may employ a cellular telephone and/or paging capabilities, may be considered a computer system which may be used with the present invention. Generally, a computer system of the present invention includes a processor and memory which is coupled to the processor and which stores software instructions which cause the processor to perform the various methods of the present invention. Generally, software for the present invention may be stored in a mass storage device 111 or a storage disc 112, which may be magnetic or optical, until such time the processor 101 retrieves from storage and down loads into the main memory 105 for processing.

Figure 1B:
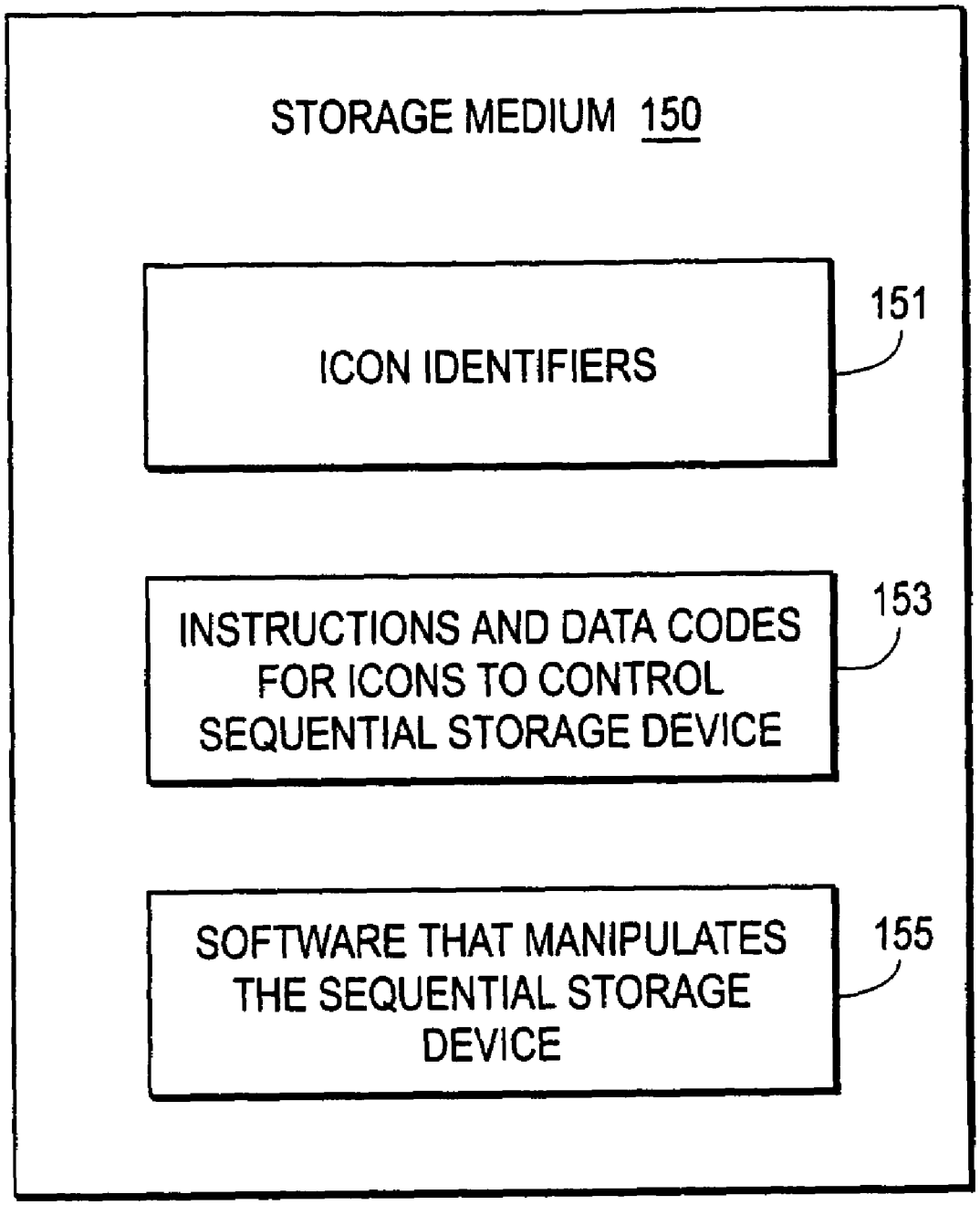
FIG. 1b is a diagram of a storage medium that may contain an embodiment of the invention.

FIG. 1b is an example of a storage medium 150 which may be random access memory (RAM), hard disk, compact disc and/or magnetic disc, among others. The storage medium 150 comprises icon identifiers 151, instruction and data codes 153 for the icons to control the sequential storage device connected to the computer system and software 155 that manipulates the storage device under control of the icons. Processor 101 processes the data and instructions from the main memory 105. Software 155 also manipulates the capture, aspect ratio display format and movement of time based data streams, for instance video data and edited sequences of video data from different source data streams.

A feature of the software allows the selection of a 16:9 aspect ratio display format during capture of video content through a preferences screen displayed for the user containing icon identifiers and/or locations for the input of capture preference.

Figure 1C:
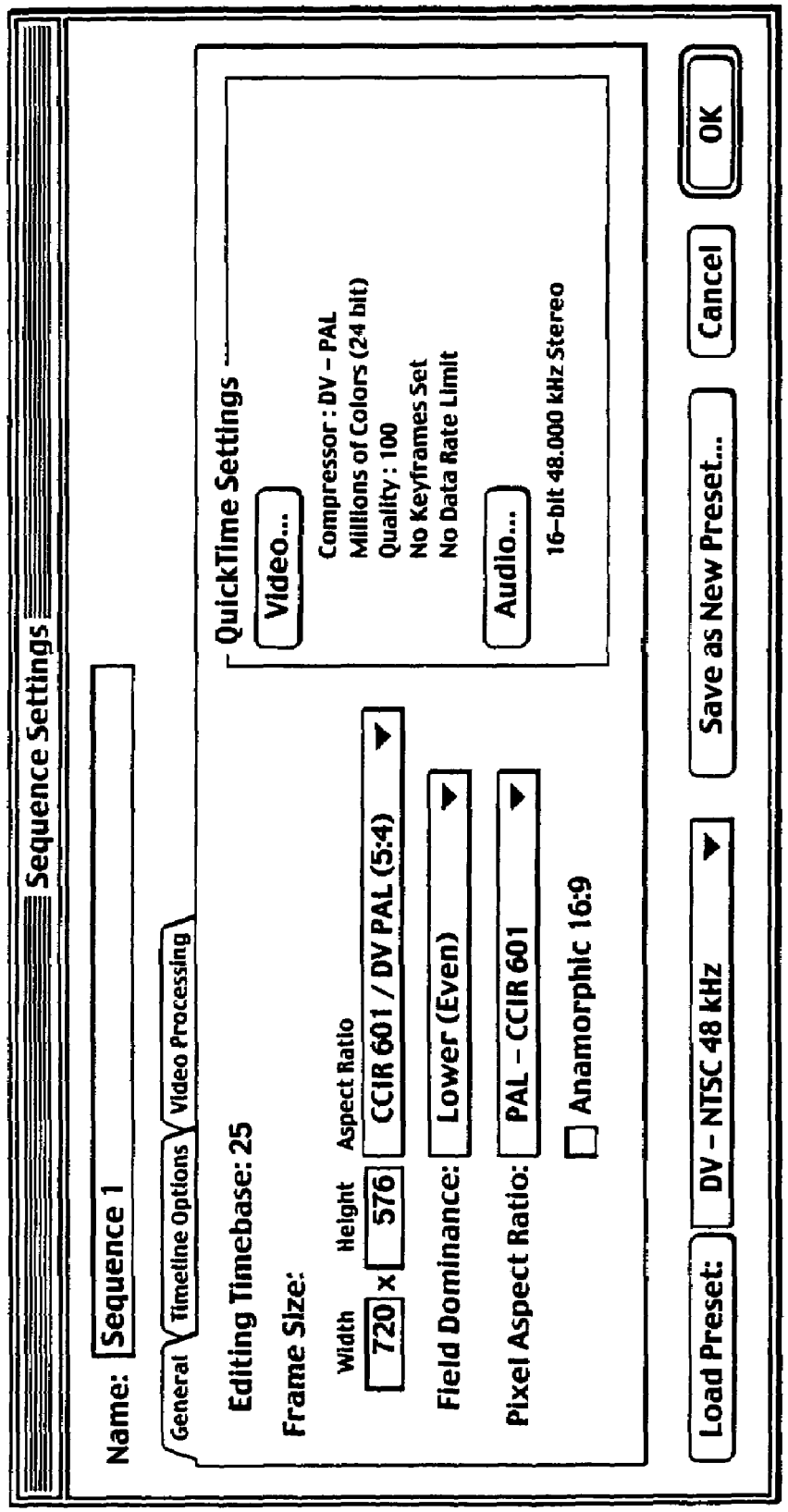
FIGS. 1c, 1d, and 1e show three different examples of data input screens.
Figure 1D:
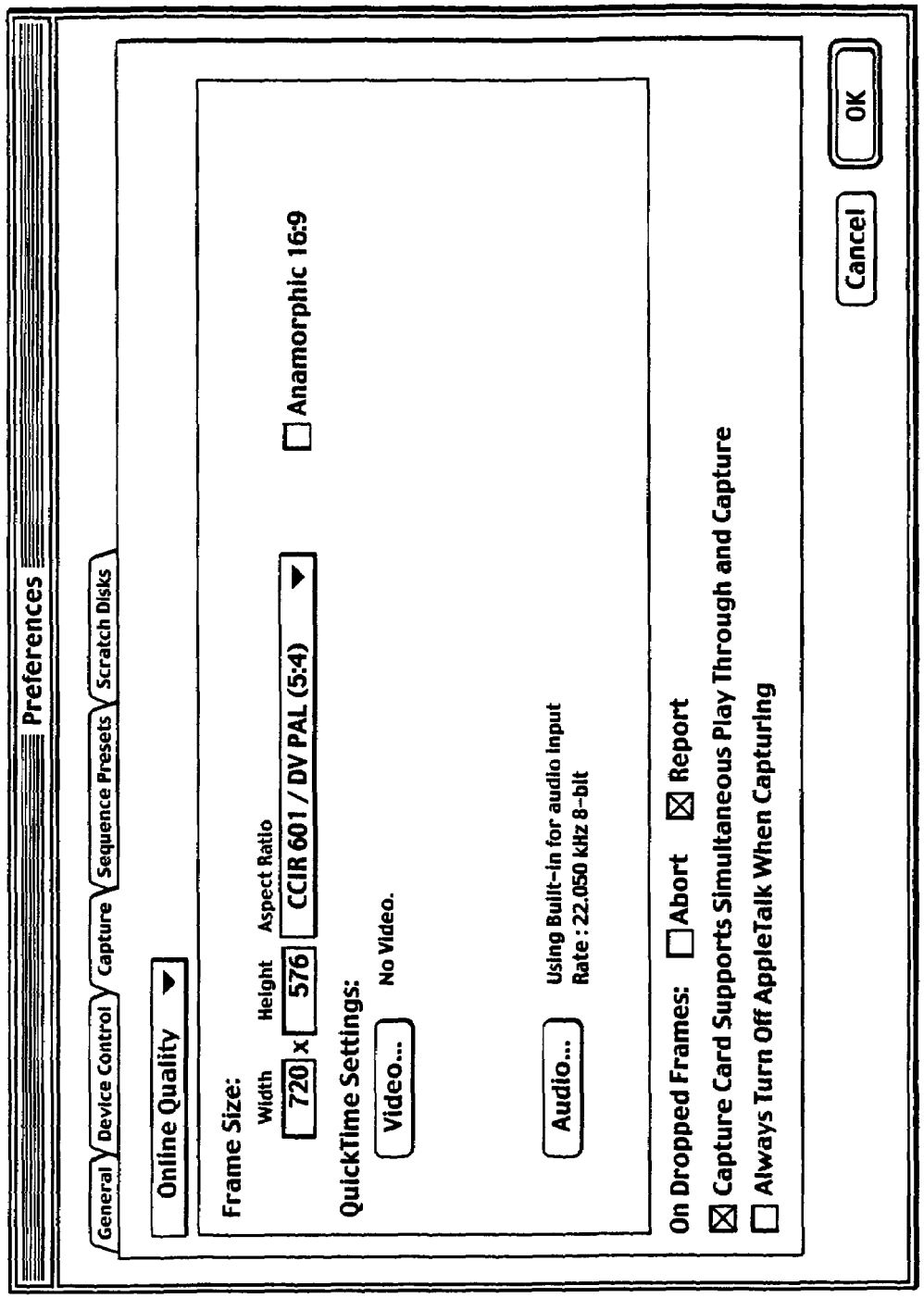
Figure 1E:
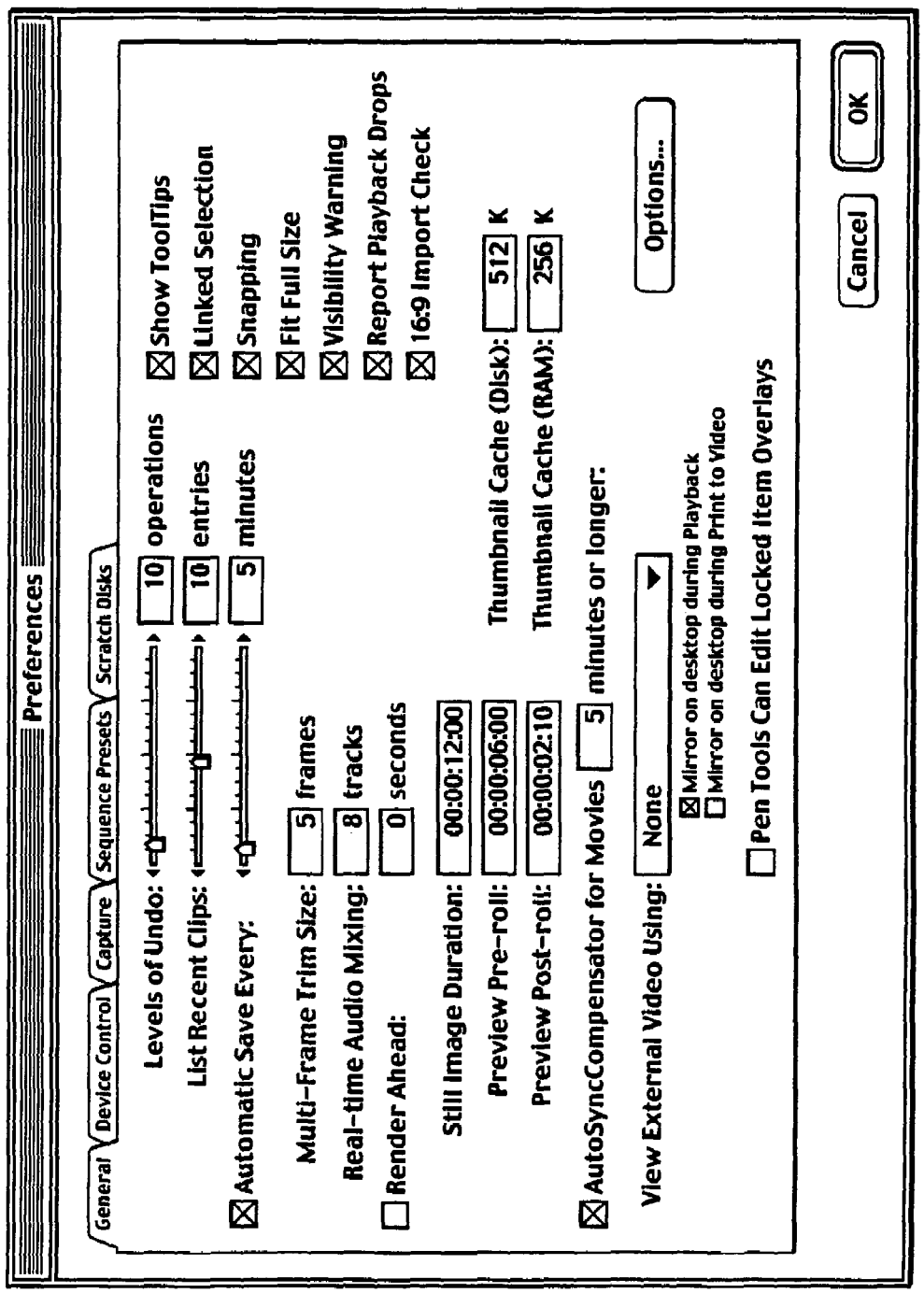

FIGS. 1c, 1d, and 1e show three different examples of preference screens which may be displayed on a display device (e.g. display 119) of a computer system according to certain embodiments of the present invention. These preference screens may be considered data input screens which allow a user of the computer system to enter data selections which are referred to as preferences. Thus, the user may check off ("select") the box next to "Anamorphic 16:9" on FIG. 1c or 1d or the box next to "16:9 Import Check" on FIG. 1e to indicate that the computer system take various actions with respect to data stored (or to be stored) on the computer system. For example, selecting the box next to "Anamorphic 16:9" on FIG. 1c tells the system that the particular sequence (e.g. a certain section of a movie) of a movie stored on a computer system's storage device will be maintained in a 16:9 format (e.g. movie clippings added to this sequence will be maintained (or transformed) into 16:9 format). Selecting the box next to "Anamorphic 16:9" on FIG. 1d tells the system to treat image or movie data to be captured as 16:9 formatted data; this may be used where the flag bit, which indicates that the image or movie data is in 16:9 format, is not present in the data so that the system can be told by the user that the data is in 16:9 format. Selecting the box next to "16:9 Import Check" on FIG. 1e causes the computer system, when capturing or otherwise importing image data from another source, to automatically check for the flag bit which indicates that the data is in 16:9 format. In one embodiment this box is selected (as shown by the "X" mark in FIG. 1e) as a default so that the system performs this check. Upon detecting the flag bit as part of this check, the system will store the data in 16:9 format and can maintain this format (e.g. in a hard disk such as 111 in FIG. 1a) and output the data in this format to another storage device such as a video tape deck or other sequential storage device.

A further feature of software 155 may be a "drag and drop" capability that allows video segments to be moved from one place to another, e.g., to construct video sequences. Software 155 can also otherwise manipulate the display of data streams, for instance format the video streams and recognize their display aspect ratio and pixel configuration. Command selections and information to direct the flow of data and instructions to the processor 101 may be performed by a user via the alphanumeric device 113 and/or cursor control device 117 or voice recognition. The processor 101 processes the data and instructions and the results may be displayed on a display device 119.

Figure 2:
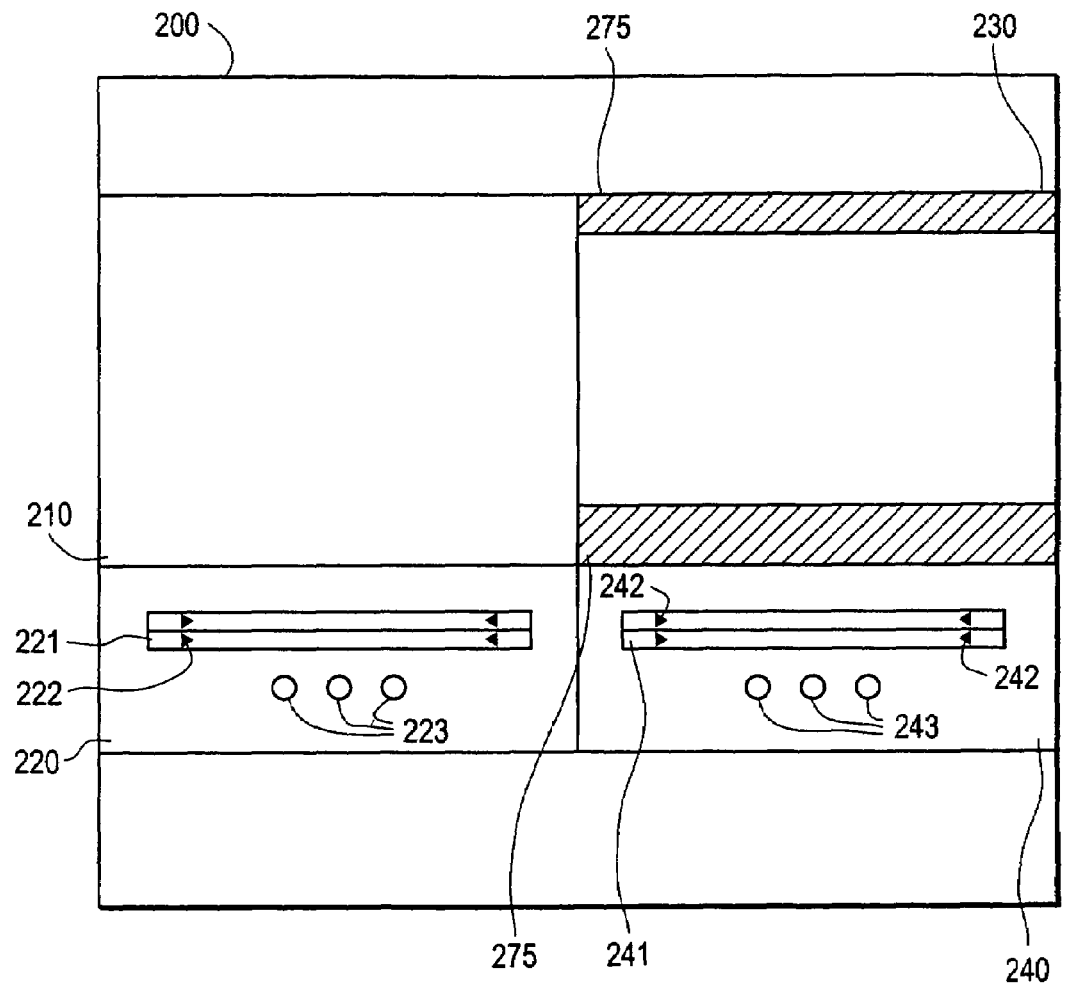
FIG. 2 is a diagram of a graphics user interface that may be used with an embodiment of the invention.

FIG. 2 is an example of a graphics user interface (GUI) 200 that may be used with an embodiment of the invention. However, other interfaces may be used. The GUI 200 is displayed on a display device 119 (see FIG. 1a) and aids the user in controlling the flow of data and instructions to the processor 101. Typically the GUI 200 comprises one or more windows, some which may be opened by the processor 101 in accordance with data and instructions and some which may be opened by the user. The figure illustrates two windows 210, 230. Window 210 is a viewer that performs as a source monitor in which various clips containing time based stream of information can be loaded. Window 230 is a canvas window into which the results of the edited video stream are transferred or where a second video stream may be viewed prior to editing. While this exemplary embodiment deals with display formats of video and still images, it is appreciated that in other embodiments the loaded time based stream of information can be, but not limited to, a plurality of video clips, a plurality of video and audio clips, or a plurality of audio clips.

For instance, various video data streams may be loaded into window 210 or window 230 by selecting icons from pull-down windows on the GUI. Prior to the actual capture and logging of the video, in one embodiment a preferences screen may appear to the user. On this screen, the user may select the option to have the video loaded in a 16:9 picture aspect ratio format. Once selected, video streams recorded with an anamorphic 16:9 aspect ratio CCD lens are displayed in certain embodiments in the full letterbox size screen on window 210, with no black lines accompanying. Given that the GUI window displays 210, 230 have adjustable borders, and are not limited to a fixed display dimension as for instance a television screen, the anamorphic image is directly captured and fills the screen area.

Control panels 220, 240 incorporate icons used for regulating and manipulating video segments and edited sequences. This may include timelines 221, 241 representing chronological sequences for a video or audio clip, edit pointers 222, 242; play, reverse and forward icons 223, 243; as well as other regulating icons which may be employed as aids to viewing or editing which would occur to those skilled in the art.

Display of a 16:9 image is processed by the underlying software 155 which contains an algorithm to process the applicable pixel aspect ratio necessary to correctly display the image. This algorithm is used to determine and resolve rotational effects in the moving image and coordinate the pixel aspect ratio accordingly to eliminate distortion.

Figure 2A:
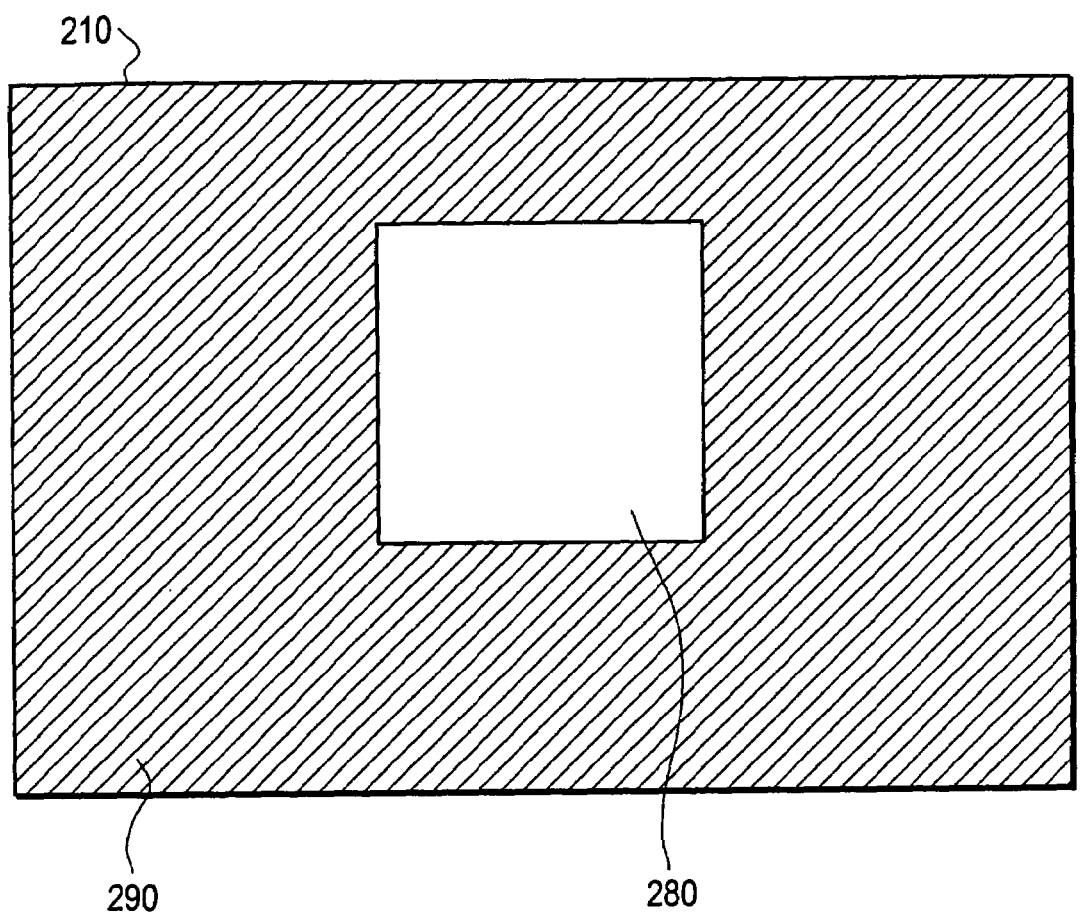
FIG. 2a is a diagram of a graphics user interface that may be used with an embodiment of the invention.

Video data streams which are in a 16:9 format, yet not anamorphic, i.e., images vertically stretched to provide this effect and not recorded using an anamorphic lens, will register their simulated anamorphic format in a programmed bit located in each frame of the digital video stream. The underlying software of the invention recognizes this bit and will automatically display the image, for instance in window 230, in a 16:9 format, though this will include black lines at the top and bottom of the image 275 reflecting the position, but will eliminate distortion of the image necessary to simulate the anamorphic effect.

Where the user selects a 16:9 aspect ratio capture mode for other format types, for instance for 4:3 aspect ratio video streams, the video stream will be captured and displayed in window 210 (for instance) or window 230 in a 16:9 format (see FIG. 2a). Where this involves a 4:3 ratio material, this will appear as a box 280 displayed within an otherwise black field 290. By scaling the picture and by other means known in the art, the picture can be stretched to fill the entire 16:9 area, nonetheless such incorporation of varying format types into a 16:9 display mode allows for seamless editing of this material with other 16:9 streams. When such material is converted to a 16:9 format aspect ratio display, the software 155 changes the information on the frame bits of the converted material to identify the display format as 16:9 upon its output, for instance either to the storage device in the computer system or to a remote storage device such as a video tape, thus informing the relevant playback device of the screen display format which is appropriate.

The process of editing a video stream in one embodiment of the invention is described in pending U.S. patent Ser. No. 09/285,934 entitled "Edit to Tape" filed on Apr. 2, 1999. Editing is performed on a time based stream of video information using a control panel located at the bottom of the window 210. Control panel 220, 240 comprise timelines 221, 241 wherein the timeline keeps track of the chronological sequence of loaded time based video content. Timeline 221, 241 includes edit pointers 212 and 213 used to select the in point and out point of the time based stream which constitutes an edited time based stream to be transferred to a destination.

When creating an edited sequence, the user may select a setting for anamorphic 16:9 indicating that the sequence should be edited to 16:9 aspect ratio display format. When adding 16:9 content to a 16:9 sequence, the material drops in directly into the edited time based stream. Non 16:9 content may be added to a 16:9 stream. The non 16:9 can be loaded either in 16:9 format or using its own format, i.e., 4:3 and viewed on the adjacent screen in the GUI 230. Inserting non-16:9 video content requires adjustment of the pixel aspect ratio to conform to the 16:9 display format. This type of conversion involves a further rendering step.

In the rendering step, frames of a video stream are computed so as to fit smoothly within a sequence. Various settings as to frame size and resolution can be set by the user as preferences for the rendering step. Otherwise the software can render the material. Still images dropped into the sequence are also adjusted to match the applicable pixel aspect ratio as well.

Upon completion of editing, the software will properly set the anamorphic bit in each DV frame, allowing proper viewing for instance in the view finder of a camcorder or on a suitable display screen.

Figure 3:
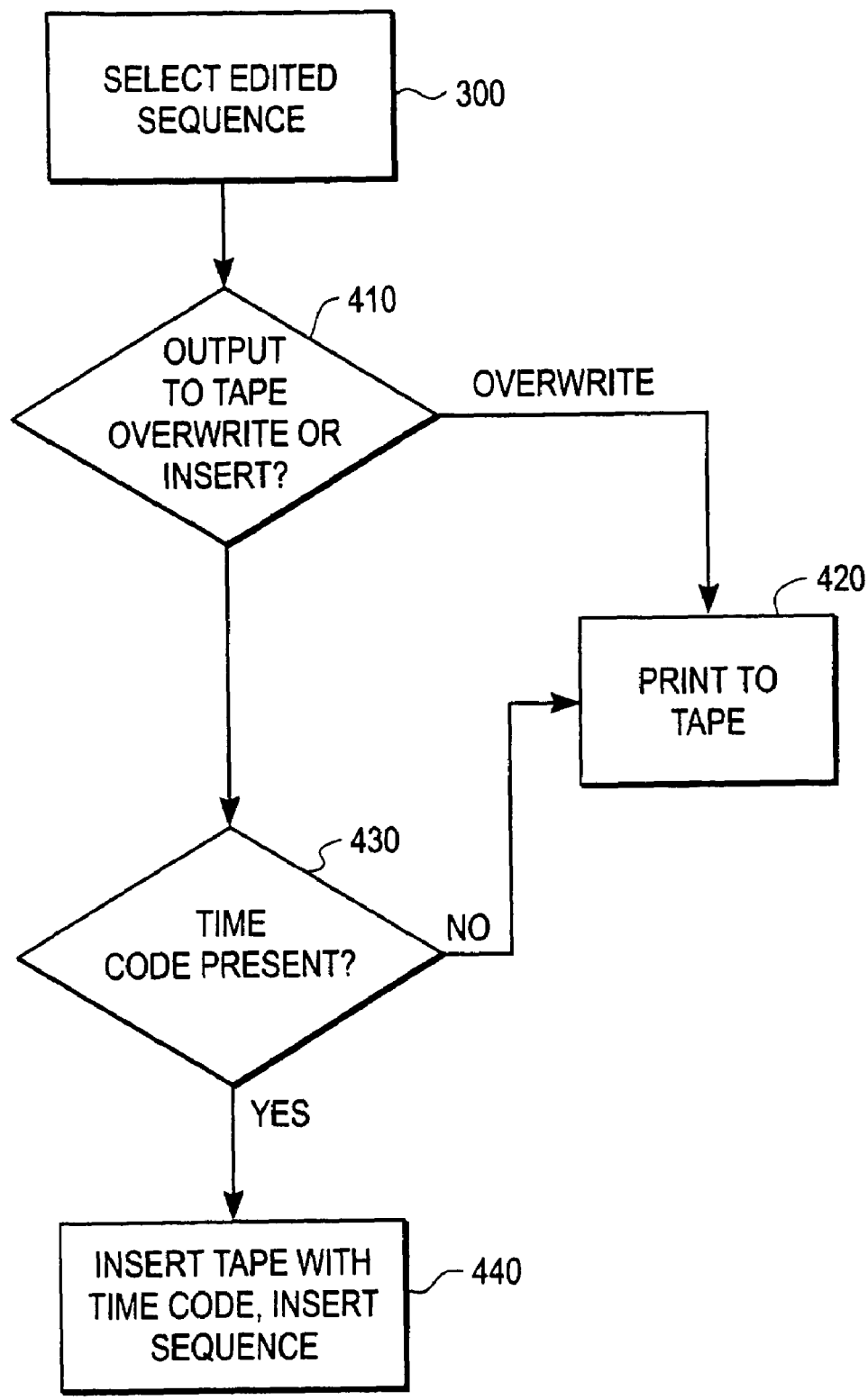
FIG. 3 is a flowchart illustrating the export sequence of video data streams in an embodiment of the invention.

FIG. 3 is a flow chart illustrating the steps for outputting completed edited content, in one embodiment of the invention. Methods for outputting video sequences are described in pending U.S. patent Ser. No. 09/285,934 entitled "Edit to Tape." For instance, edit to tape operations can be performed using various methods. The source media with edits may be stored in a file. The file icon can be then dragged to the edit to tape window or using the method of three point editing to drag edited source media to the edit to tape window using a pointing arrow.

At functional block 300, the user selects the edited sequence, which may include a video clip from one or more sources which may be stored in the system. The user then designates whether this sequence will be output to a video tape, overwriting any material thereon, or inserted within the content of the video tape, i.e., edit to tape. This is reflected in decision block 410. The output to video is accomplished by a print operation, 420 to a video tape, which is connected to the output portion of the computer system, e.g., in a connected tape deck. Where edit to tape is attempted, a time code must be on the tape to provide the reference information to successfully edit 430. The next operation involves selecting the type of edit operation, preview, insert or assemble types. The user is then prompted to insert a video tape into the connected video tape machine 440. Other methods of exporting sequences as a file, or in batch file formats, among other output methods known in the art are within the scope and contemplation of this invention. Other preparations and settings, including mastering settings, and options allowing, for instance, creation of leaders, color bars, trailer or other features may also be included.

Upon output of the edited source material, for instance to a tape or camcorder, the programmable frame bit is adjusted to a 16:9 format to provide the correct display. For material which has been scaled to simulate an anamorphic format, and which appears on display device as having black borders, software 155 scales the image to its original full sized stretched form prior to output to a storage device.

Figure 4:
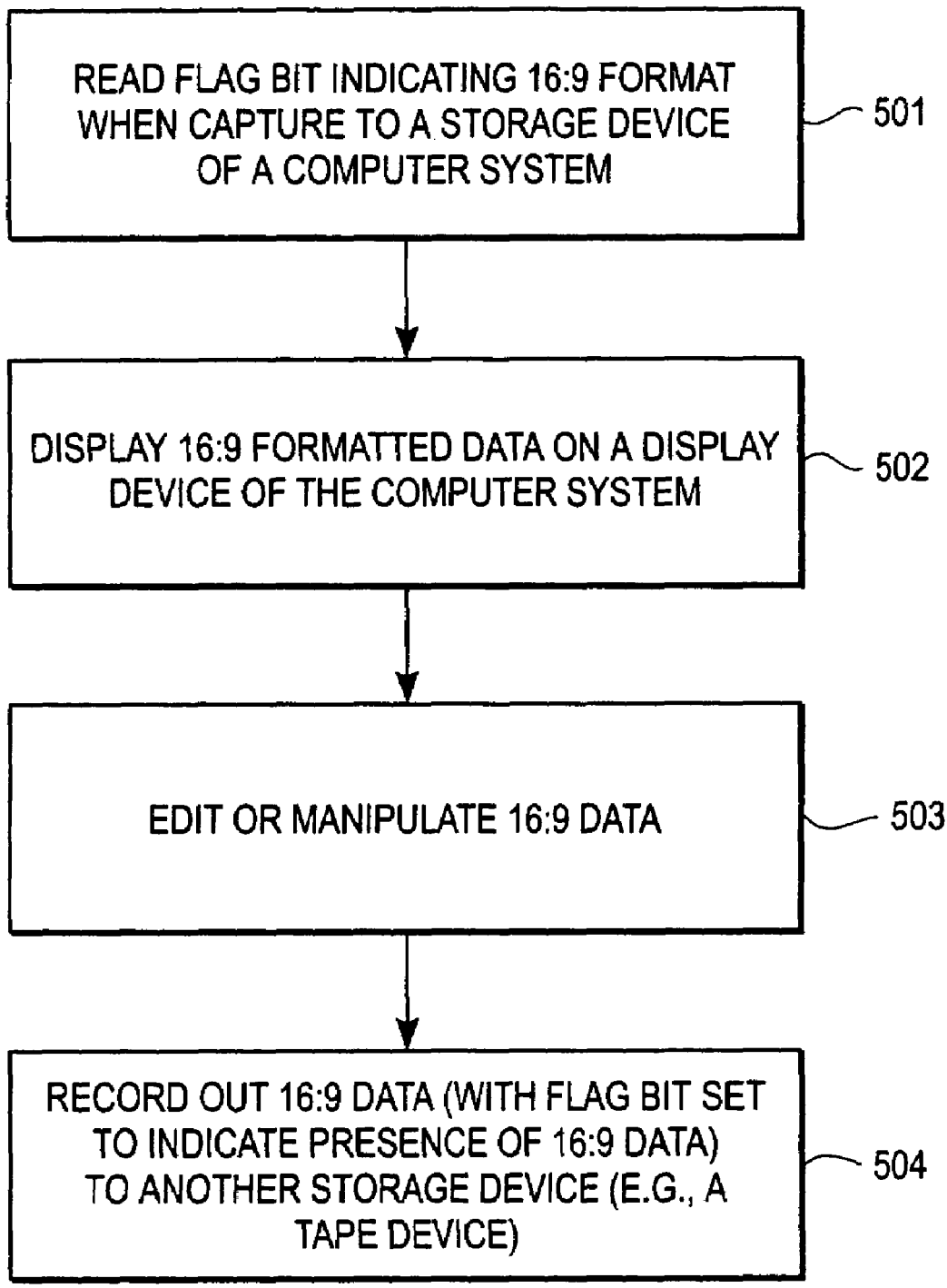
FIG. 4 shows a system level method in which 16:9 formatted data may be recorded/received by a computer system and then recorded out to another storage device (e.g. tape) in the 16:9 format.

FIG. 4 shows a system level method in which 16:9 formatted data may be imported or otherwise received by a computer system and then recorded out to another storage device (e.g. a sequential storage device such as a video tape machine) in the 16:9 format. Operation 501 involves the computer system receiving image data (e.g. from a video camera or other input device) and checking for a 16:9 flag bit automatically and detecting this bit in the received data and storing the data to a storage device (e.g. device 111) which is coupled to the computer system such as a hard disk or optical disk or magneto-optical disk. Operation 502 includes the display of 16:9 formatted data, displayed in that format, on a display device (e.g. display 119) of the computer system. Operation 503 reflects the possibility that a user may edit (e.g. delete frames of image data or mix audio data, etc.) the data in the 16:9 format. Operation 504 may follow operations 502 and 503, and it involves recording out the data (e.g. with the 16:9 flag bit set to indicate 16:9 formatted data in the data being recorded out) from the computer system into another storage device such as a sequential storage device (e.g. a video tape machine). The computer system will normally record the data out in the 16:9 format if the flag bit indicates that the data is in the 16:9 format.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A computer-implemented method comprising:
   in response to a first data stream having a graphic image captured into a computer system, automatically checking, through a processing device, for a flag bit indicating a 16:9 aspect ratio format, wherein the first data stream has an original format other than the 16:9 aspect ratio format;
   editing the first data stream that includes sequencing the first data stream having the original format other than the 16:9 aspect ratio format with a second data stream having an original 16:9 format to create a third data stream; and
   storing the third data stream within a storage device of the computer system in the 16:9 aspect ratio format if the flag bit indicates the 16:9 aspect ratio format.

2. The method of claim 1, wherein the automatically checking of the first data stream for the flag bit is to determine whether to scale the graphic image prior to outputting the first data stream to the storage device.

3. The method of claim 1, further comprising displaying the graphic image on a display device of the computer system in the 16:9 aspect ratio format, in response to the checking the bit.

4. The method of claim 1, further comprising
   editing the first data stream to generate a fourth data stream in the 16:9 aspect ratio format; and
   outputting the fourth data stream from the computer system into another storage device.

5. The method of claim 4, further comprising after the editing, setting the bit in each frame of the fourth data stream.

6. The method of claim 4, wherein the outputting of the fourth data stream is performed in 16:9 aspect ratio format if the fourth data stream has the bit.

7. The method of claim 1, wherein the automatically checking of the first data stream for the bit is performed in accordance with a set of one or more attributes from a user.

8. The method of claim 7, wherein the one or more attributes are configurable via a graphical user interface (GUI).

9. The method of claim 1, further comprising setting the bit in a frame of the first data stream to indicate that the frame is in the 16:9 aspect ratio format.

10. The method of claim 1 further comprising
    receiving the second data stream;
    rendering the first data stream and the second data stream; and
    setting the bit in each frame of the third data stream to indicate that the third data stream is to be in the 16:9 aspect ratio format.

11. The method of claim 10, further comprising outputting the third data stream to another storage device.

12. A machine-accessible medium having stored thereon instructions that, when executed by a computer system, cause the computer system to perform operations comprising:
    in response to a first data stream having a graphic image captured into a computer system, automatically checking for a flag bit, wherein the flag bit indicating a 16:9 aspect ratio format, wherein the first data stream has an original format other than the 16:9 aspect ratio format;
    editing the first data stream that includes sequencing the first data stream having the original format other than the 16:9 aspect ratio format with a second data stream having an original 16:9 format to create a third data stream; and storing the third data stream within a storage device of the computer system in the 16:9 aspect ratio format if the flag bit indicates the 16:9 aspect ratio format.

13. The machine-accessible medium of claim 12, wherein the automatically checking of the first data stream for the flag bit is to determine whether to scale the graphic image prior to outputting the first data stream to the storage device.

14. The machine-accessible medium of claim 12, further including data that cause the computer system to perform operations comprising displaying the graphic image on a display device of the computer system in the 16:9 aspect ratio format, in response to checking the bit.

15. The machine-accessible medium of claim 12, wherein further including data that cause the computer system to perform operations comprising
   editing the first data stream to generate a fourth data stream in the 16:9 aspect ratio format; and
   outputting the fourth data stream from the computer system into another storage device.

16. The machine-accessible medium of claim 15, further including data that cause the computer system to perform operations comprising
   after the editing, setting the bit in each frame of the fourth data stream.

17. The machine-accessible medium of claim 15, wherein the outputting of the fourth data stream is performed in 16:9 aspect ratio format if the fourth data stream has the bit.

18. The machine-accessible medium of claim 12, wherein the automatically checking of the first data stream for the bit is performed in accordance with a set of one or more attributes from a user.

19. The machine-accessible medium of claim 18, wherein the one or more attributes are configurable via a graphical user interface (GUI).

20. The machine-accessible medium of claim 12, further including data that cause the computer system to perform operations comprising setting the flag bit in the frame of the first data stream to indicate that the frame is in the 16:9 aspect ratio format.

21. The machine-accessible medium of claim 12 further including data that cause the computer system to perform operations comprising
   receiving the second data stream;
   rendering the first data stream and the second data stream; and
   setting the bit in each frame of the third data stream to indicate that the third data stream is to be in the 16:9 aspect ratio format.

22. The machine-accessible medium of claim 21, further including data that cause the computer system to perform operations comprising outputting the third data stream to another storage device remote from the computer system.

23. A system, comprising:
   means for in response to a first data stream having a graphic image captured into a computer system, automatically checking for a flag bit, wherein the flag bit indicating a 16:9 aspect ratio format, wherein the first data stream has an original format other than a 16:9 aspect ratio format;
   means for editing the first data stream that includes sequencing the first data stream having the original format other than the 16:9 aspect ratio format with a second data stream having an original 16:9 format to create, a third data stream; and
   means for storing the third data stream within a storage device of the computer system in the 16:9 aspect ratio format if the flag bit indicates the 16:9 aspect ratio format.

24. The system of claim 23, wherein the means for automatically checking of the first data stream for the flag bit is to determine whether to scale the graphic image prior to outputting the first data stream to the storage device.

25. The system of claim 23, further comprising means for displaying the graphic image on a display device of the computer system in the 16:9 aspect ratio format, in response to the checking the bit.

26. The system of claim 23, further comprising
   means for editing the first data stream to generate a fourth data stream in the 16:9 aspect ratio format; and
   means for outputting the fourth data stream into another storage device.

27. The system of claim 26, further comprising means for after the editing, setting the bit in each frame of the fourth data stream.

28. The system of claim 26, wherein the outputting of the fourth data stream is performed in 16:9 aspect ratio format if the fourth data stream has the bit.

29. The system of claim 23, wherein the automatically checking of the first data stream for the bit is performed in accordance with a set of one or more attributes received from a user.

30. The system of claim 29, wherein the one or more attributes are configurable via a graphical user interface (GUI).

31. The system of claim 23, further comprising means for setting the flag bit in the frame of the first data stream to indicate that the frame is in the 16:9 aspect ratio format.

32. The system of claim 23 further comprising
   means for receiving the second data stream;
   means for rendering the first data stream and the second data stream; and
   means for setting the bit in each frame of the third data stream to indicate that the third data stream is to be in the 16:9 aspect ratio format.

33. The system of claim 32, further comprising:
   means for outputting the third data stream to another storage device remote from the computer system.

34. A system comprising:
   an input/output controller to receive a first data stream comprising a graphic image, the first data stream having an original format other than a 16:9 aspect ratio format;
   a processor coupled to the input/output controller to automatically check for a flag bit indicating the 16:9 aspect ratio format;
   to sequence the first data stream having the original format other than the 16:9 aspect ratio format with a second data stream having an original 16:9 format to create a third data stream; and
   a storage device coupled to the processor, wherein the processor is further configured to store the third data stream having the original format other than the 16:9 aspect ratio format in the 16:9 aspect ratio format in the storage device based on the flag bit indicating the 16:9 aspect ratio format.

35. The system of claim 34, further comprising a display device to display the image in the 16:9 aspect ratio format.

36. The system of claim 34, wherein the processor is to set the flag bit in the frame of the first data stream to indicate that the frame is in the 16:9 aspect ratio format.

37. The system of claim 34, wherein the input/output controller is to receive the second data stream;

the processor is to render the first data stream and the second data stream to create the third data stream; and to set the flag bit in each frame of the third data stream to indicate the 16:9 aspect ratio format.

38. The system of claim 37, wherein the input/output controller is to output the third data stream to another storage device.

39. The system of claim 34, wherein the processor is to edit the first data stream in the 16:9 aspect ratio format and to set the flag bit in each frame of the first data stream to output the first data stream into another storage device in the 16:9 aspect ratio format.

40. The system of claim 34, wherein the display device is to display a graphical user interface ("GUI") that is set to automatically check the first data stream for the flag bit that indicates the 16:9 aspect ratio format.

* * * * *

UNITED STATES PATENT AND TRADEMARK OFFICE
CERTIFICATE OF CORRECTION

PATENT NO. : 7,697,017 B2
APPLICATION NO. : 11/484242
DATED : April 13, 2010
INVENTOR(S) : Randall Hayes Ubillos Page 1 of 1

It is certified that error appears in the above-identified patent and that said Letters Patent is hereby corrected as shown below:

In column 9, line 59, in Claim 23, after "bit" delete ", wherein the flag bit".

In column 9, line 66, in Claim 23, delete "create," and insert -- create --, therefor.

Signed and Sealed this
Eighth Day of November, 2011

David J. Kappos
*Director of the United States Patent and Trademark Office*